US008112690B2

(12) United States Patent
Crumley et al.

(10) Patent No.: US 8,112,690 B2
(45) Date of Patent: Feb. 7, 2012

(54) METHOD, SYSTEM, AND COMPUTER PROGRAM PRODUCT FOR CONNECTION STATE RECOVERY AFTER FAULT

(75) Inventors: Paul G. Crumley, Yorktown Heights, NY (US); William H. Miller, Newburgh, NY (US); Louis W. Ricci, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/037,191

(22) Filed: Feb. 26, 2008

(65) Prior Publication Data
US 2009/0217089 A1     Aug. 27, 2009

(51) Int. Cl.
*H03M 13/00*     (2006.01)
(52) U.S. Cl. ............... 714/758; 714/15; 709/224; 398/1
(58) Field of Classification Search .................. 714/15, 714/758, 799; 709/224; 398/1
See application file for complete search history.

(56) References Cited

U.S. PATENT DOCUMENTS
5,191,579 A    3/1993  Matsushita et al.
6,735,391 B2 * 5/2004  Lee et al. .................. 398/3
2002/0147807 A1 * 10/2002  Raguseo ................. 709/224
2002/0174232 A1   11/2002  Kikuta et al.
2003/0187991 A1 * 10/2003  Lin et al. .................. 709/227

OTHER PUBLICATIONS z/Architecture, Principles of Operation, Sixth Edition, Apr. 2007, Publication No. SA22-7832-05, copyright IBM Corp. 1990-2007, pp. 1-1218.

* cited by examiner

*Primary Examiner* — Guy Lamarre
(74) *Attorney, Agent, or Firm* — Cantor Colburn LLP; Steven Chiu (57) ABSTRACT

A method, system, and computer program product for connection state recovery of a connection after fault in a networked channel-to-channel computer system are provided. The method includes identifying essential data in response to detecting a state change in a channel of the computer system, the essential data including connection state information used in performing a recovery operation. The method also includes separating the essential data from transient or incidental data, augmenting the essential data with validation data, and storing the augmented essential data in a memory location of a control unit in communication with the channel. In response to initiation of a recovery operation, the method includes retrieving the augmented essential data and validating contents of persistent data fields containing the essential data. The method further includes using the contents to restore the connection to an operational state when it is determined that the contents of the persistent data fields are valid.

20 Claims, 5 Drawing Sheets

METHOD, SYSTEM, AND COMPUTER PROGRAM PRODUCT FOR CONNECTION STATE RECOVERY AFTER FAULT

BACKGROUND OF THE INVENTION

The present disclosure relates generally to connection state recovery and, in particular, to a method, system, and computer program product for quick recovery of existing connections in a network of computer systems after one or more faults occur in a node or link of that network.

Existing protocols and implementations provide ways for channels to exchange data with control units in a fiber channel network and to recover from a wide range of local and system faults. However, the current architecture does not provide a way to recover from certain types of control unit faults without invoking higher levels of recovery to recreate the local, connection-specific operating state.

Channel and control units are implemented by specialized computer programs. These programs can hold large amounts of data that are used to maintain the proper operation of the flow of data between the programs and devices. State information that is kept local to the control unit is considered unreliable for restoring after a fault, since the fault may have corrupted the state information. Even though well-known memory error correction techniques may have been employed, the nature of the fault may have changed the contents of the local memory in a manner such that future references to it do not detect memory errors.

Current techniques for safely saving state information require a storage medium that is remote from the hardware and computer program that may encounter faults. These techniques require additional hardware, and thus additional real monetary cost. The remote nature of this storage medium adds latency and computing time to save state information as it changes, and when it needs to be restored after a fault.

The channel is typically physically located with a host computer system and there are mechanisms provided by the host system to allow the channel to save and restore its operational data. Control units are traditionally stand-alone devices that are relatively stateless. Control units do not take actions on their own but rather their operations are directed by commands sent from channels.

Currently, there is no general, architected mechanism to save and restore operational data in a control unit. This is not normally a problem as control units operate in a relatively simple, deterministic manner. The essential data of most control units would be reconstructed by knowing the devices which are attached to the control unit and knowing how the control unit is attached to the data network. These pieces of information can be learned from the attached components.

Some control units, in particular, channel-to-channel (CTC) control units do not operate in a simple, reproducible way. As an example, CTC control units have specialized load-balancing facilities that can cause exact distribution of workload to be placed in a way that maximizes overall system performance. These load-balancing decisions are made when a communications path between two CTC-capable channels is established. The load balancing mechanism uses a snapshot of a subset of the system-wide resource information, so it is possible that different load balancing decisions will be made depending on details that vary over time. Since the exact conditions at the moment of the decision cannot be reproduced, the data which describes the results of the load balancing decision must be preserved, across local and system faults, to preserve the ability of the particular connection to operate.

The loss of the state information within one CTC control unit, due to a fault within the channel hardware or computer program, is detected by and causes errors in the other CTC channels which had been communicating with the affected CTC. The other affected channels may be within the same or other physical computing system as the channel containing the CTC control unit. Depending upon the state of the CTC channel at the time of the fault, the application software that is using the CTC connection(s) between the channel that had the fault and the other channels may not be able to recover and will cease using that connection.

What is needed, therefore, is a way to preserve operational data needed by integrated control units, such as a CTC control unit, thereby maintaining the load balance and preventing the loss of the communication path.

BRIEF SUMMARY OF THE INVENTION

Embodiments of the invention include a method for connection state recovery of a connection after fault in a networked channel-to-channel computer system. The method includes identifying essential data in response to detecting a state change in a channel of the computer system, the essential data including connection state information used in performing a recovery operation. The method also includes separating the essential data from transient or incidental data, augmenting the essential data with validation data, and storing the augmented essential data in a memory location of a control unit in communication with the channel. In response to initiation of a recovery operation, the method includes retrieving the augmented essential data and validating contents of persistent data fields containing the essential data. The method further includes using the contents to restore the connection to an operational state when it is determined that the contents of the persistent data fields are valid.

Additional embodiments include a system and computer program product for connection state recovery after fault in a networked channel-to-channel computer system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with an exemplary embodiment, connection recovery processes are provided. The connection recovery processes provide a technique for preserving connection state information across various types of system or component faults in a channel-to-channel (CTC) system, such that recovery of the system/component to its operational state can be achieved. The connection recovery processes provide a programmatic way to store essential data (i.e., operational data, state data, etc., that is needed to perform recovery operations upon the occurrence of a system/component fault or interruption) in a safe, persistent place, or particular pieces of trusted data that can be used to reconstruct the essential data when needed. In particular, the connection recovery processes identify the essential data, augment that data with the appropriate validation information (e.g., error detection and/or correction codes), and store this prepared set of data in a well-known local location at a control unit before a fault or other system interruption occurs. Once a fault occurs, the prepared data is retrieved, verified for integrity, and then used to reconstruct the operational state of the affected CTC component so the component can continue to work as though no fault had occurred. By storing this prepared data locally, there is a reduction in the latency typically involved in a CTC system that uses remotely stored state information to perform recovery operations.

Figure 1:
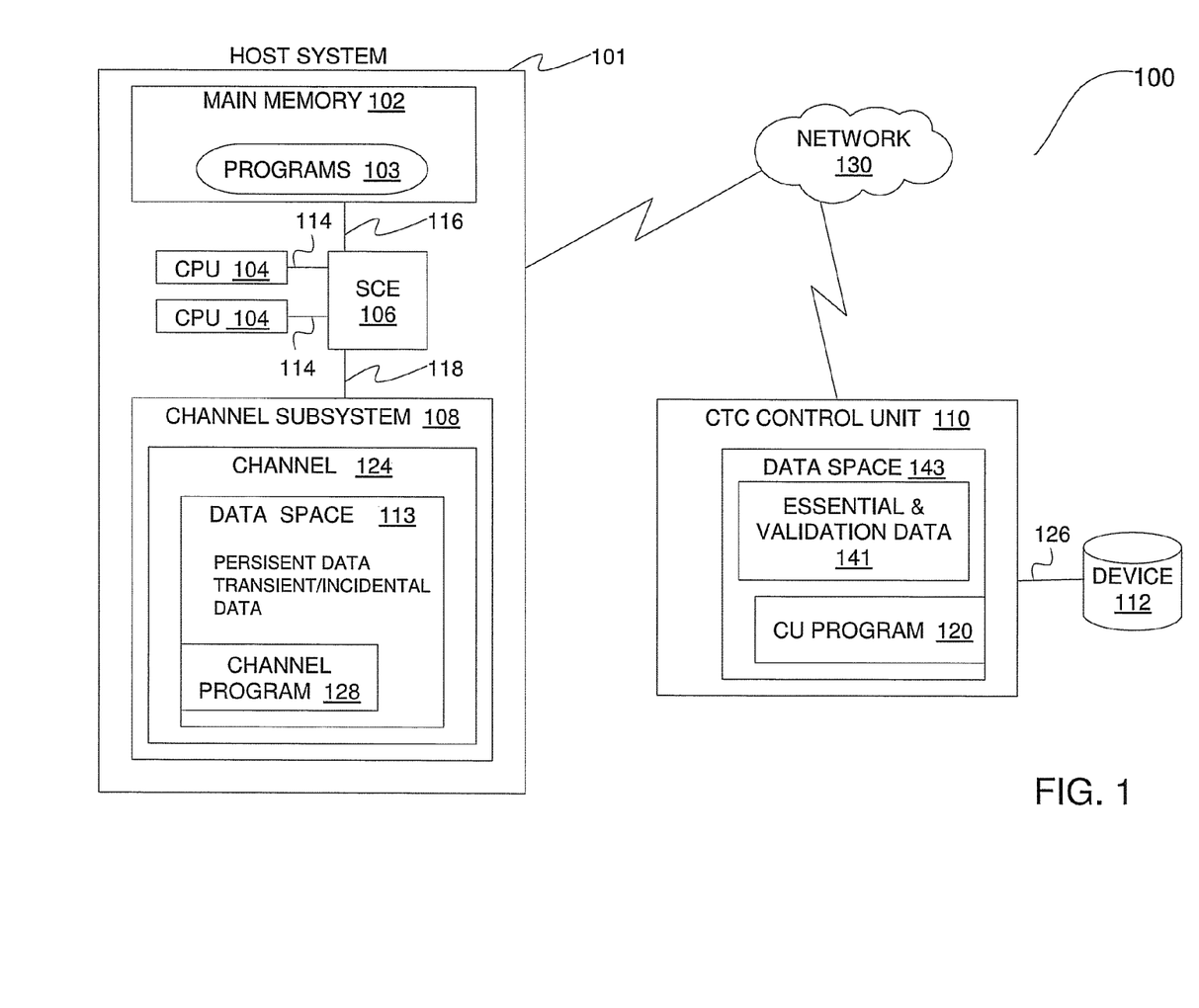
FIG. 1 is a block diagram illustrating a system upon which connection recovery processes may be implemented in accordance with an exemplary embodiment.

One example of a processing system incorporating and using one or more aspects of the present invention is described with reference to FIG. 1. For purposes of illustration, the system 100 of FIG. 1 may be an input/output (I/O) processing system in which a device (e.g., device 112) is an I/O device. Further, various components and interactions of fiber channels and control units associated with the system 100 of FIG. 1 will now be described. The channels provide a path by which programs access devices, and which are controlled by control units over a data network. The system 100 of FIG. 1 includes one or more network nodes 101, each of which is in communication with a network 130. By way of example, network node 101 is a host system, which includes a main memory 102, one or more central processing units (CPUs) 104, a storage control element 106, and a channel subsystem 108. The host system 101 may be a large scale computing system, such as a mainframe or server. The processing system 100 also includes one or more control units 110 and one or more I/O devices 112, each of which is described below. In an exemplary embodiment, the control unit 110 is a channel-to-channel (CTC) control unit that facilitates communications between multiple channels.

Main memory 102 stores data and programs 103. For example, the main memory 102 may include one or more operating systems (OSs) that are executed by one or more of the CPUs 104. For example, one CPU 104 can execute a Linux® operating system and a z/OS® operating system as different virtual machine instances. The main memory 102 is directly addressable and provides for high-speed processing of data by the CPUs 104 and the channel subsystem 108.

CPU 104 may contain sequencing and processing facilities for instruction execution, interruption action, timing functions, initial program loading, and other machine-related functions. CPU 104 may be coupled to the storage control element 106 via a connection 114, such as a bidirectional or unidirectional bus.

Storage control element 106 may be coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control unit 110 via network 130. Channel subsystem 108 directs the flow of information between the device 112 and main memory 102. It relieves the CPUs 104 of the task of communicating directly with the device 112 and permits data processing to proceed concurrently with processing activities, such as I/O processing.

In one example, one or more channels 124 are located within the channel subsystem 108. In another example, it is also possible to have multiple systems, and therefore multiple channel subsystems (not depicted) in communication with control unit 110. If the channel subsystem 108 includes more than one channel, the communications path may be established between them. Alternatively, where more than one network node (e.g., host systems) need to share information, the communications path may be established between the network nodes.

Each of the channels 124, or subchannels thereof (not shown), may be provided for and dedicated to each device 112 accessible to a program 128 through the channel subsystem 108. A subchannel (e.g., a data structure, such as a table) may provide the logical appearance of a device to the program. Each channel 124 provides information concerning the associated device 112 and its attachment to channel subsystem 108. The channel 124 also provides information concerning operations and other functions involving the associated device 112. This information is used by the connection recovery processes as will be described further herein. The channel 124 is the means by which channel subsystem 108 provides information about associated devices 112 to CPUs 104, which obtain this information by executing I/O instructions.

The channel subsystem 108 includes a data space 113, in which data that is shared via the communications path is located. The data space 113 includes persistent data and transient or incidental data used by programs/applications and devices that are communicating via the path. A channel program 128 holds this data in order to maintain proper operation of data flow between these programs and devices.

As indicated above, channel subsystem 108 is coupled to one or more control units 110 over network 130. Each control unit 110 provides logic to operate and control one or more devices 112 and adapts, through the use of common facilities, the characteristics of each device 112 to the interface provided by the channel 124. The common facilities provide for the execution of, e.g., I/O operations, indications concerning the status of the device 112 and control unit 110, control of the timing of data transfers over the network 130 and certain levels of device 112 control.

Each control unit 110 is attached via a connection 126 (e.g., a bus) to one or more devices 112. Devices 112 receive information or store information in main memory 102 and/or other memory. Examples of devices 112 include card readers and punches, magnetic tape units, direct access storage devices, displays, keyboards, printers, pointing devices, teleprocessing devices, communication controllers and sensor based equipment, to name a few.

One or more of the above components of the processing system 100 are further described in "IBM® z/Architecture Principles of Operation," Publication No. SA22-7832-05, 6th Edition, April 2007, the contents of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

The connection recovery processes are performed in a CTC control unit computer program 120 executing on the control unit 110. The connection recovery processes include two stages. First, when persistent state data changes, such as when a channel (e.g., channel 124) that previously did not have a communication path with the CTC control unit 110, establishes such a communication path, the state information (i.e., essential information) is updated locally (e.g., in a data space 143 of the control unit 110), then it is augmented with additional validation information (e.g., ECC codes), which is used to ensure that the essential data has not been corrupted. The prepared (augmented) data 141 is stored in the data space 143. Second, after a fault occurs in the CTC channel 124, the essential data is processed using the same algorithm that was used to generate the validation information in order to ensure that the data is valid. The control unit program 120 validates that the essential data has not been compromised. If the essential data is determined to be valid, it is used to reconstruct the operational state of the load balancing and communications paths between the recovering CTC channel 124 and all of the other CTC channels (not shown) or components it was communicating with prior to the fault.

The connection recovery processes segregate the data that must be preserved (e.g., the essential data) from the transient or incidental data (e.g., remaining data in the data space 143), to maintain the proper operation of the communications path. The essential data is augmented with the additional information, which can be used to ensure the essential data has not been corrupted. It is also possible to provide additional information which could be used to correct the essential data. Such information would be needed if, e.g., the storage medium that stores the essential and transient data were susceptible to data corruption over time.

Figure 2:
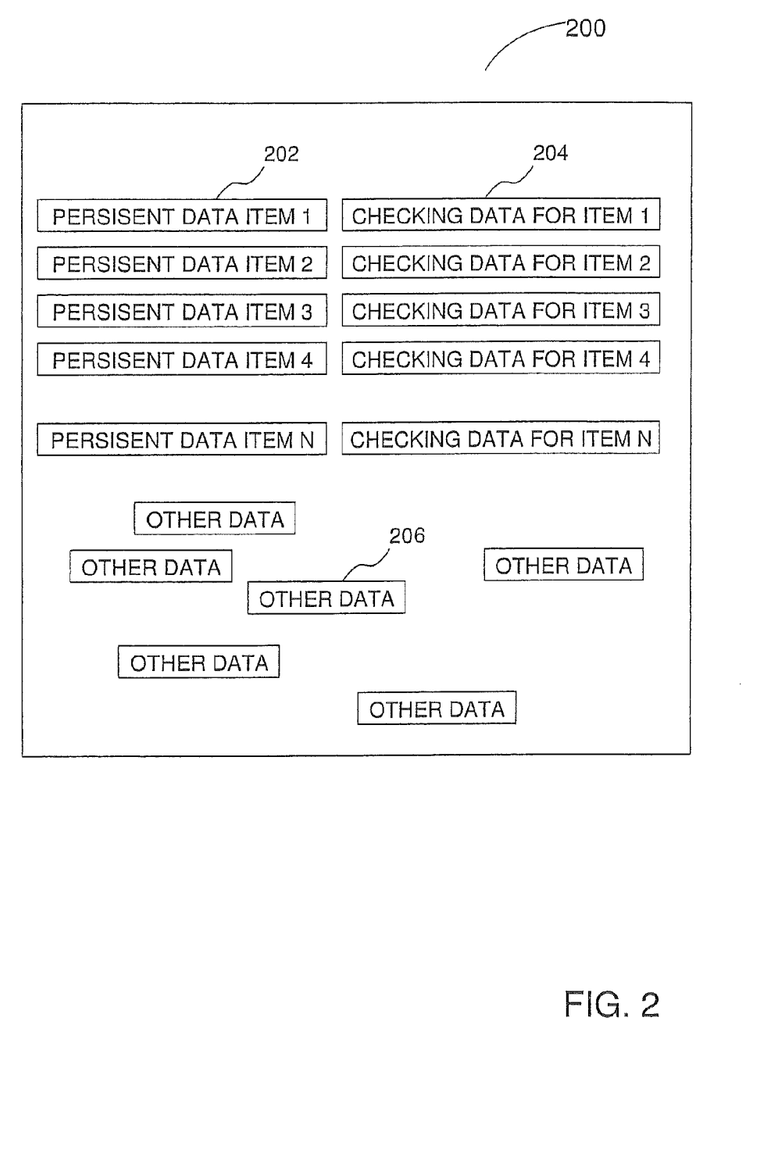
FIG. 2 is a diagram illustrating essential data and validation information that is stored in local memory and used by the connection recovery processes in accordance with an exemplary embodiment.

The connection recovery processes may organize the actual storage of the essential data and the augmenting checking (validation) data as is convenient and efficient. The essential data may be left interspersed with the transient data or may be segregated in a special region of the program address space (e.g., data space 143). The augmentation data can also be distributed, as with the essential data, as determined to best meet the needs of the particular situation. As shown in FIG. 2, a diagram 200 depicting the essential data segregated from the transient data (i.e., other data) in the data space 143.

The essential data is stored in persistent data fields 202. Each of the persistent data fields 202 corresponds with a checking data (validation data) field 204. In one embodiment, transient or incidental data (other data) are shown in FIG. 2 as stored separately from the essential data and validation information. The essential data may be identified by the designer(s) of the program implementing the connection recovery processes. Examples of essential data include the number of current connections, the current state of each connection, and load balancing information, to name a few. The essential data may be segregated from the transient data by several means, e.g., essential data may be stored contiguously and separately from the transient data. Alternatively, the essential data may be interspersed with the transient data, but the validation data is calculated using only the essential data.

Examples of transient or incidental data include the node identifier (which contains the machine serial number and manufacturer, among other data) of the channel to which the CTC is connected, the time of day the connection was first made, and the number of messages passed on the connection, to name a few.

The connection recovery processes provide a mechanism by which the validation information (e.g., checking and correction data), which augments the essential data, is updated if the essential data is altered in the course of operation (e.g., when another CTC channel establishes a connection with the CTC channel of interest). The combination of the essential data and the checking data should always be kept in a valid state. The validation data is obtained by applying an algorithm (e.g., a Checksum, Longitudinal Redundancy Check, or Cyclical Redundancy Check, to name a few) to the essential data. The type of validation (i.e., the algorithm) may be determined by factors, such as the quantity of the data, the frequency that it is expected to change, the degree of protection required for the data, the reliability of the underlying computing system (e.g., one of nodes in network system 100), and the amount of time that can be afforded to apply the algorithm. In one embodiment, a 4-byte checksum may be used as validation data, and ECC is not applied to either the essential data or the validation data, other than the base ECC provided by the memory hardware of the system itself.

When ECC is employed, a decision is made as to how many bits to apply to the ECC character. The same factors described above may also apply.

Figure 3A:
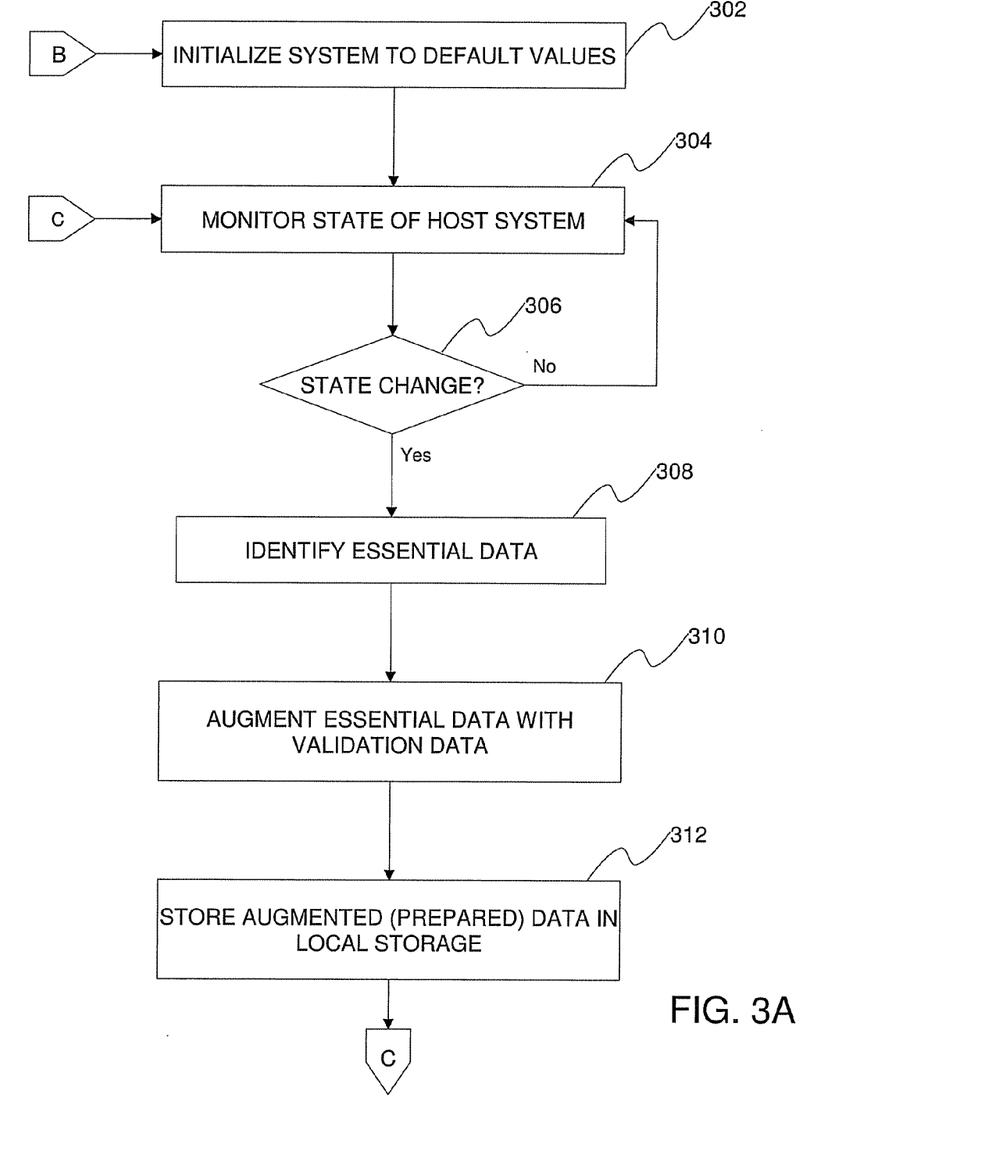
FIG. 3A is a flow diagram describing a process for preparing the essential data and validation information before a fault occurs.
Figure 3B:
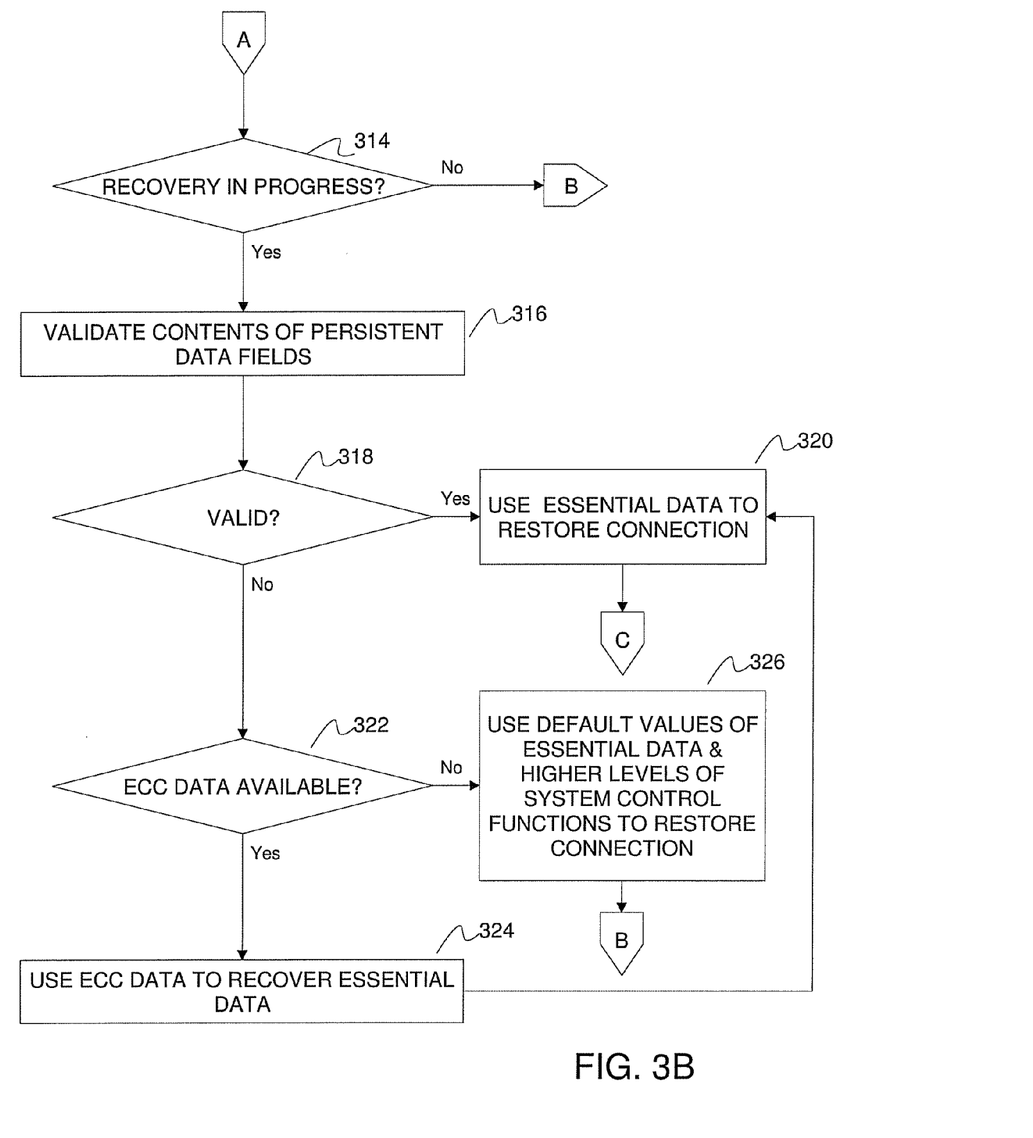
FIG. 3B is a flow diagram describing a process for verifying and validating the essential data after a fault occurs.

Turning now to FIGS. 3A and 3B, the connection recovery processes will now be described in an exemplary embodiment. The preparation stage is described in FIG. 3A and the validation stage is described in FIG. 3B.

Under normal operating conditions, the connection recovery processes place no additional burden on the basic operation of the control unit program 120. The connection recovery processes provide techniques that are used when control unit 110 is recovering from a local or a system fault. At step 302, the CTC channel 124 and control unit 110 are initialized upon powering up the system or by a manual reset. Initialization includes storing default values of the persistent data locally in data space 143. The default values may be the values used at initialization or any other set of values that are capable of re-establishing the connection to a predictable state (though not necessarily the same state as existed prior to the fault). The default values are a set of failsafe values that will ensure that the connection can be reestablished.

At step 304, the control unit program 120 monitors the state of the channel component (e.g., host system 101). At step 306, it is determined whether a state change has occurred (e.g., establishment of a communications path) with respect to the channel subsystem 108. If not, the monitoring continues and process returns to step 304. Otherwise, if a state change has been detected, the control unit program 120 identifies essential data within data space 113 at step 308. At step 310, the control unit program 120 augments the essential data with validation data (checking data). At step 312, the prepared (augmented) essential data 141 is stored locally in data space 143. The essential data/validation information 141 and the other data (transient/incidental data) are stored in corresponding data fields 202, 204, and 206 as shown in FIG. 2. The process returns to step 304 whereby the state monitoring continues.

When a power cycle or fault occurs, the process proceeds to the validation stage as described in FIG. 3B. The connection recovery processes determine if a recovery is in process at step 314. If this is not a recovery condition, the process returns to step step 302 whereby the system is initialized to default values at step 302 and the state monitoring continues.

If, however, the control unit program 120 is handling recovery from a fault at step 314, the connection recovery processes recover the essential data (e.g., from persistent data fields 202) so the connection can be restored to an operational state. This is done by using the validation data (from fields 204) that was created before the fault to validate the contents of the persistent data fields 202 at step 316.

If the validation succeeds at step 318, the essential data is used to restore the connection to its original operational state (that is, before the fault) at step 320, and the process returns to step 304. If the checking operation does not succeed, and the implementation provides error correction information for the essential data at step 322, the connection recovery process uses the error correction data to recover/reconstruct the essential data at step 324. The process then returns to step 320, whereby the essential data is used to restore the operational state, and the process returns to step 304. If, however, the essential data cannot be recovered by using the previously stored data (i.e., validation data from fields 204) at step 322, the CTC control unit program 120 uses the default values of the essential data (from step 302), as well as higher levels of system control functions to recover normal operations at step 326, and the process returns to step 304. For example, the default values and higher levels of system control functions may be accessed to destroy and recreate the connection.

Technical effects of the connection recovery process provide connection state recovery after a fault by a programmatic technique that identifies essential data, augments that data with the appropriate error detection and correction codes, and stores this set of data in a well-known local location before a fault or other system interruption occurs. After a fault, the prepared data is retrieved, verified for integrity, and then used to reconstruct the operational state of the affected CTC component so the component can continue to work as though no fault had occurred.

Figure 4:
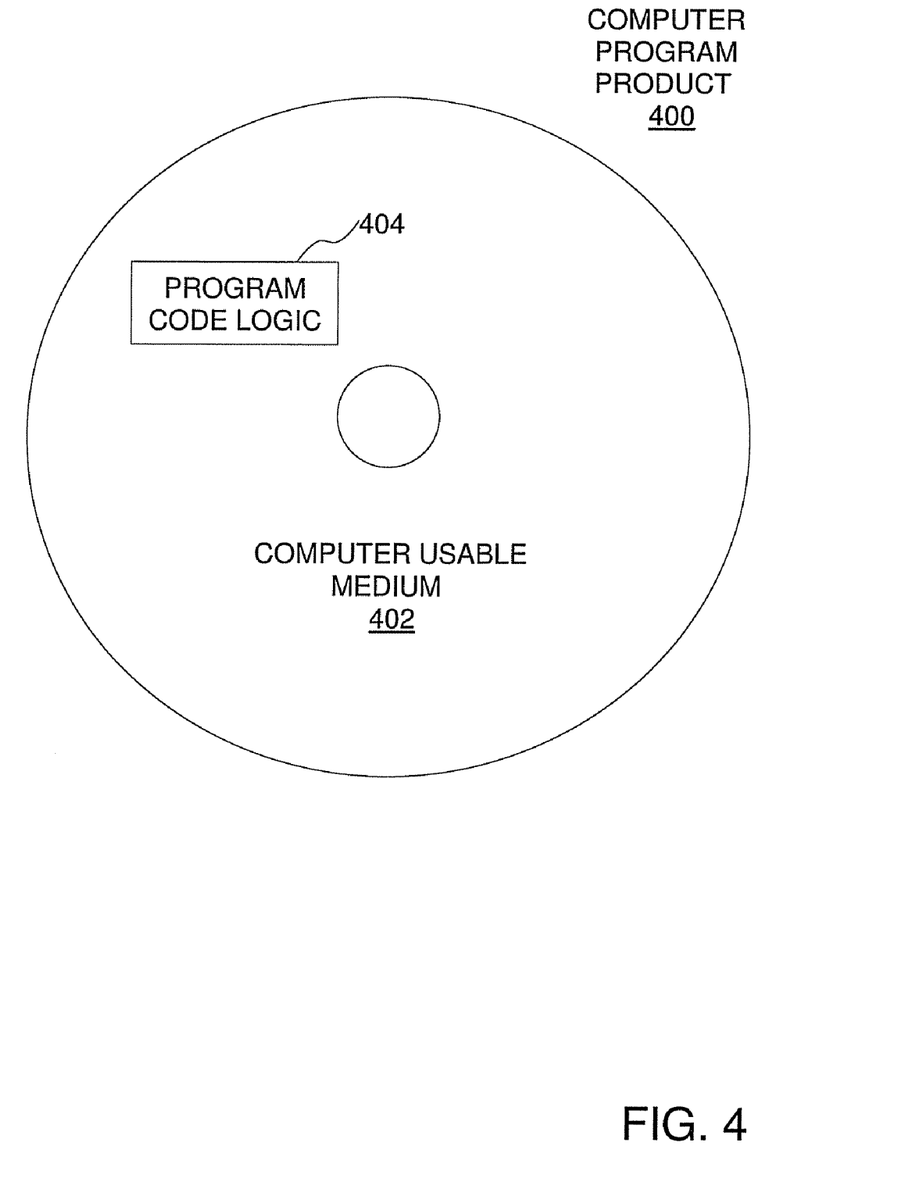
FIG. 4 is a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for connection state recovery of a connection after fault in a node or link of a networked channel-to-channel computer system, comprising:
    identifying essential data in response to detecting a state change in a channel of the networked computer system, the essential data including connection state information used in performing a recovery operation;
    separating the essential data from transient or incidental data;
    augmenting the essential data with validation data and storing the augmented essential data in a memory location of a control unit in communication with the channel;
    in response to initiation of a recovery operation, performing:
    retrieving the augmented essential data and validating contents of persistent data fields containing the essential data; and
    using the contents to restore the connection to an operational state when it is determined that the contents of the persistent data fields are valid.

2. The method of claim 1, further comprising:
    upon determining the contents of the persistent data fields are not valid,
    checking for availability of correction data, the correction data including at least one of error detection codes and correction codes; and
    upon determining that the correction data is available, using the correction data to reconstruct the essential data.

3. The method of claim 2, further comprising:
initializing the persistent data to default values upon powering up or manually resetting one or more nodes or links in the channel-to-channel computer system;
wherein in response to determining that the correction data is not available, using the default values to recover the essential data.

4. The method of claim 1, further comprising:
monitoring the channel for the state change.

5. The method of claim 1, wherein the essential data includes at least one of:
a number of current connections in the channel-to-channel computer system;
a current state of each of the connections; and
load balancing information for the connections.

6. The method of claim 1, wherein the validation data is determined by applying an algorithm including at least one of a Checksum, Longitudinal Redundancy Check, and Cyclical Redundancy Check to the essential data.

7. The method of claim 6, wherein a type of validation data is determined by factors including at least one of:
quantity of the essential data;
frequency in which the essential data is expected to change;
the degree of protection required for the essential data;
the reliability of the channel-to-channel computing system; and
the amount of time that can be afforded to apply the algorithm.

8. A system for connection state recovery of a connection after fault in a node or link of a networked channel-to-channel computer system, the system comprising:
a channel-to-channel control unit; and
a control unit program executing on the control unit, the control unit program performing a method, comprising:
identifying essential data in response to detecting a state change in a channel of the networked computer system, the essential data including connection state information used in performing a recovery operation;
separating the essential data from transient or incidental data;
augmenting the essential data with validation data and storing the augmented essential data in a memory location of the control unit in communication with the channel;
in response to initiation of a recovery operation, performing:
retrieving the augmented essential data and validating contents of persistent data fields containing the essential data; and
using the contents to restore the connection to an operational state when it is determined that the contents of the persistent data fields are valid.

9. The system of claim 8, wherein the control unit program further performs:
upon determining the contents of the persistent data fields are not valid,
checking for availability of the correction data, the correction data including at least one of error detection codes and correction codes; and
upon determining that the correction data is available, using the correction data to reconstruct the essential data.

10. The system of claim 9, wherein the control unit program further performs:
initializing the persistent data to default values upon powering up or manually resetting one or more nodes or links in the channel-to-channel computer system;
wherein in response to determining that the correction data is not available, using the default values to recover the essential data.

11. The system of claim 8, wherein the control unit program further performs:
monitoring the channel for the state change.

12. The system of claim 8, wherein the essential data includes at least one of:
a number of current connections in the channel-to-channel computer system;
a current state of each of the connections; and
load balancing information for the connections.

13. The system of claim 8, wherein the validation data is determined by applying an algorithm including at least one of a Checksum, Longitudinal Redundancy Check, and Cyclical Redundancy Check to the essential data.

14. The system of claim 13, wherein a type of validation data is determined by factors including at least one of:
quantity of the essential data;
frequency in which the essential data is expected to change;
the degree of protection required for the essential data;
the reliability of the channel-to-channel computing system; and
the amount of time that can be afforded to apply the algorithm.

15. A computer program product for connection state recovery of a connection after fault in a node or link of a networked channel-to-channel computer system, the computer program product comprising:
a tangible storage medium readable by a processing circuit and storing instructions for execution by the processing circuit for performing a method comprising:
identifying essential data in response to detecting a state change in a channel of the networked computer system, the essential data including connection state information used in performing a recovery operation;
separating the essential data from transient or incidental data;
augmenting the essential data with validation data and storing the augmented essential data in a memory location of a control unit in communication with the channel;
in response to initiation of a recovery operation, performing:
retrieving the augmented essential data and validating contents of persistent data fields containing the essential data; and
using the contents to restore the connection to an operational state when it is determined that the contents of the persistent data fields are valid.

16. The computer program product of claim 15, wherein the method further comprises:
upon determining the contents of the persistent data fields are not valid,
checking for availability of correction data, the correction data including at least one of error detection codes and correction codes; and
upon determining that the correction data is available, using the correction data to reconstruct the essential data.

17. The computer program product of claim 16, wherein the method further comprises:
initializing the persistent data to default values upon powering up or manually resetting one or more nodes or links in the channel-to-channel computer system;
wherein in response to determining that the correction data is not available, using the default values to recover the essential data.

18. The computer program product of claim 15, wherein the method further comprises:

monitoring the channel for the state change.

19. The computer program product of claim 15, wherein the essential data includes at least one of:

a number of current connections in the channel-to-channel computer system;

a current state of each of the connections; and load balancing information for the connections.

20. The computer program product of claim 15, wherein the validation data is determined by applying an algorithm including at least one of a Checksum, Longitudinal Redundancy Check, and Cyclical Redundancy Check to the essential data;

wherein a type of validation data is determined by factors including at least one of:

quantity of the essential data;

frequency in which the essential data is expected to change;

the degree of protection required for the essential data;

the reliability of the channel-to-channel computing system; and the amount of time that can be afforded to apply the algorithm.

* * * * *